3,476,782
6,17-DIMETHYL-9β,10α-ANDROSTANES
Engbert Harmen Reerink, Pieter Westerhof, and Hendrik Frederik Louis Scholer, all of Van Houtenlaan, Weesp, Netherlands
No Drawing. Continuation-in-part of application Ser. No. 565,671, July 15, 1966, which is a continuation-in-part of application Ser. No. 561,292, June 28, 1966. This application Feb. 6, 1968, Ser. No. 703,244
Int. Cl. C07c *169/66, 169/22;* A61k *27/00*
U.S. Cl. 260—397.4    3 Claims

ABSTRACT OF THE DISCLOSURE 6,17-dimethyl - 17β - hydroxy-9β,10α-androsta-1,4-diene and 1,4,6-triene-3-one having useful anabolic androgenic and progestational activities.

---

This application is a continuation-in-part of our copending application Ser. No. 565,671, filed July 15, 1966 which is a continuation of application Ser. No. 470,874, filed July 9, 1965 and now abandoned. This application is also a continuation-in-part of copending application Ser. No. 561,292, filed June 28, 1966 now Pat. No. 3,362,968 which is a continuation of application Ser. No. 343,197 filed Feb. 7, 1964 and now abandoned, said application Ser. No. 343,197 was a division of application Ser. No. 201,824 filed June 12, 1962 and now U.S. Patent 3,198,792. Said application Ser. No. 201,824 was a continuation-in-part of application Ser. No. 805,020, filed Apr. 8, 1959 and now abandoned.

This invention relates to two novel steroids of the 9β,10α-androstane series. The two novel compounds of this invention are 6,17-dimethyl - 17β - hydroxy-9β,10α-androsta-4,6-dien-3-one.

The compound 6,17 - dimethyl-17β-hydroxy-9β,10α-androsta-4,6-dien-3-one is disclosed but not claimed in our aforementioned copending application Ser. No. 565,671 and Ser. No. 561,292.

Both of the compounds of our invention have useful hormonal activities and are particularly useful as progestational, androgenic and anabolic agents. They may be employed in substantially the same manner, including dosages and methods of administration, as the well known progestational, androgenic or anabolic agents for example those listed on pages 344–347 and 355–372 of "New Drugs," 1965 edition, published by the American Medical Association, Chicago, Ill.

The invention will now be described in greater detail with reference to the following examples:

Example I

Into a stirred solution of 1.0 g. of 6α,17α-dimethyl-17β-hydroxy-9β,10α-androst-4-en-3-one (prepared as described above) in 70 ml. of a solution of anhydrous hydrogen chloride in dry dioxan (136 mg. of HCl per ml. of solution) there was added at 8° C. a solution of 800 mg. of 2,3-dichloro-5,6-dicyanobenzoquinone in 20 ml. of the said HCl/dioxan solution.

After stirring at 8° C. for 20 minutes the reaction mixture was filtered, poured into 400 ml. of 1 N sodium hydroxide solution and extracted with methylene chloride. The extract was washed with water, 1 N sodium hydroxide solution and again with water. After evaporation of the solvent a 804 mg. residue was obtained which was chromatographed on 100 g. of silicagel. After elution with benzene (+5% acetone) there was obtained 6,17α-dimethyl - 17β - hydroxy - 9β,10α - androsta - 4,6 - dien-3-one melting at 167–169°; $[\alpha]_D^{25}$: −566° (0.1%, dioxan): $\epsilon$292 Nm.=24,000.

Example II 2.55 g. of 6,17α-dimethyl - 17β - hydroxy-9β,10α-androsta-4,6-dien-3-one (prepared as described in the preceding example) were dissolved in 100 ml. of dioxan containing 2% of 24% HCl solution. After addition of 2.58 g. of 2,3-dichloro-5,6-dicyano-benzoquinone the solution was stirred for 3 hours at room temperature under an argon atmosphere. Then, 150 ml. of dioxan and 120 g. of anhydrous sodium carbonate were added. The solution was stirred for 30 minutes at room temperature and for 1 hour under reflux. The cooled solution was filtrated and concentrated to 100 ml. After addition of 100 ml. of benzene the solution was filtrated over alox. The alox column was washed with ethyl acetate. The filtrate was evaporated. There was thus obtained 3 g. of crude 6,17α-dimethyl-17β-hydroxy - 9β,10α-androsta-1,4,6-trien-3-one. After chromatography on silicagel (hexane/acetone=5:1) the physical constants of the pure compound were: M.P. 163–164° (from methylene chloride/ether): $[\alpha]_D^{25}$= −399° (0.1%, dioxan); 228 Nm. =14,800; 308 Nm.=11,500; shoulder at 250 Nm.=9400.

Example III 6,17-dimethyl-17β hydroxy-9β, 10α-androsta-1,4,6-trien-3-one was dissolved in dimethylformamide. This solution was filtered through a bacterial retentive filter and the sterile filtrate was poured out into sterile distilled water. Micro crystalline particles of the said steroid of a particle size of 1–10μ orifinated. The crystals were filtered off and dried in vacuo over P₂O₅. All manipulations took place under aseptic conditions. 5 g. of the sterile micro crystalline crystals of the said steroid were suspended under aseptic conditions in 200 ml. of a sterile aqueous solution of the following composition:

|  | Mg. |
|---|---|
| Polysorbate 80 U.S.P. | 200 |
| Sodium chloride | 1800 |
| Methylester of p-hydroxy-benzoic acid | 320 |
| Propylester of p-hydroxy-benzoic acid | 80 |
| Sterile distilled water ad 200 mg. | |

Under aseptic conditions sterile ampouls and vials were filled with this sterile suspension after careful homogenization of the same.

Example IV 6,17-dimethyl - 17β - hydroxy-9β,10α-androsta-4,6-dien-3-one were dissolved in chloroform, which solution was mixed homogeneously with 194 g. of lactose.

The mixture was dried at 40° C. during 1 hour. The mixture was wetted with a 10% aqueous solution of 2 g. of gelatine and subsequently ground through a 20 mesh sieve. The mixture was dried at 40° C. during 24 hours, whereupon the granules were ground through a 20 mesh sieve. The mixture was weighted and then had added to it proportional amounts of talcum venetum and magnesium stearate in amounts of optically 25 mg. and 2 mg. respectively. The resulting mixture was homogenized and worked to tablets of 225 mg. each.

While we have described our invention in connection with specific embodiments and applications, other modifications thereof will be readily apparent to those skilled in this art without departing from the spirit and scope of the invention.

What we claim is:

1. A 9β,10α-steroid of the androstane series selected from the group consisting of 6,17-dimethyl-17β-hydroxy-9β,10α-androsta-1,4,6-trien-3-one and 6,17-dimethyl-17β-hydroxy-9β,10α-androsta-4,6-dien-3-one.

2. As the 9β,10α-steroid of claim 1, 6,17-dimethyl-17β-hydroxy-9β,10α-androsta-1,4,6-trien-3-one.

3. As the 9β10α-steroid of claim 1, 6,17-dimethyl-17β-hydroxy-9β10α-androsta-4,6-dien-3-one.

References Cited

UNITED STATES PATENTS 3,194,803   7/1965   Colton.

ELBERT L. ROBERTS, Primary Examiner

U.S. Cl. X.R.

260—999

UNITED STATES PATENT OFFICE
CERTIFICATE OF CORRECTION

Patent No. 3,476,782     Dated  November 4, 1969

Inventor(s) Engbert Harmen Reerink et al.

It is certified that error appears in the above-identified patent and that said Letters Patent are hereby corrected as shown below:

Column 1, line 35, after "are" insert -- 6,17-dimethyl-17 β hydroxy-9 β, 10 α- androsta-1,4,6-trien-3-one and --.

Signed and sealed this 18th day of August 1970.

(SEAL)
Attest:

EDWARD M. FLETCHER, JR.     WILLIAM E. SCHUYLER, JR.
Attesting Officer           Commissioner of Patents